Nov. 20, 1928.  1,691,978

A. J. LIEDTKE ET AL

CLUTCH

Filed Aug. 30, 1920   2 Sheets-Sheet 1

INVENTORS
ARTHUR J. LIEDTKE
CHARLES J. TRAVERS
By Paul Paul
ATTORNEYS

Nov. 20, 1928.  1,691,978
A. J. LIEDTKE ET AL
CLUTCH
Filed Aug. 30, 1920    2 Sheets-Sheet 2
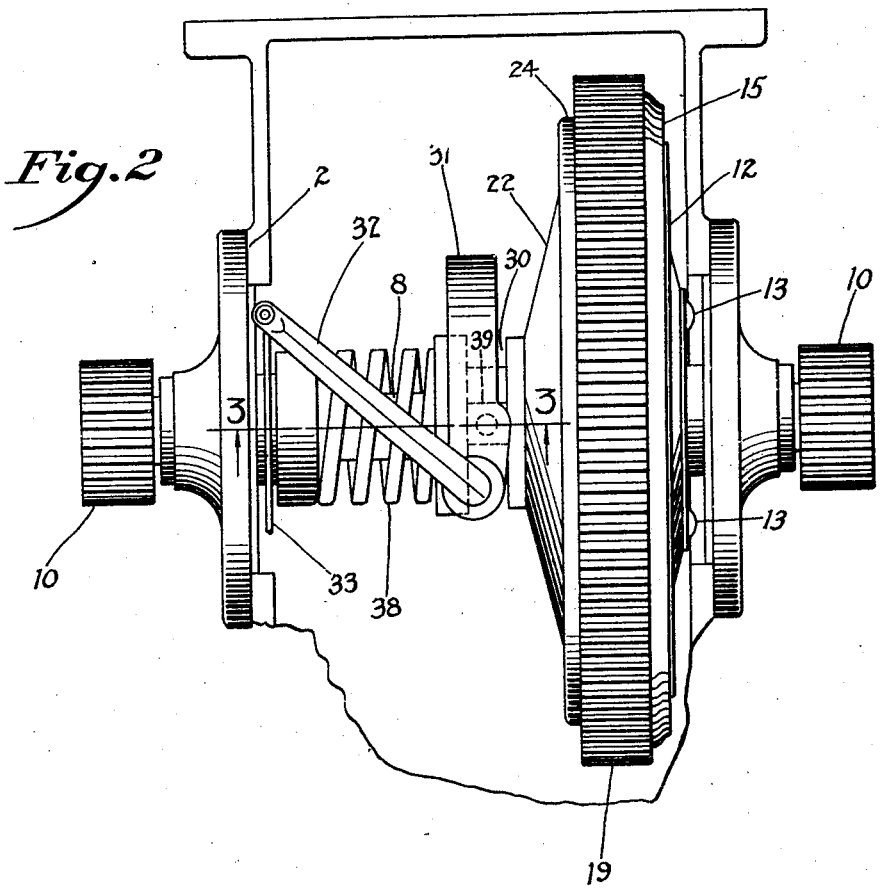
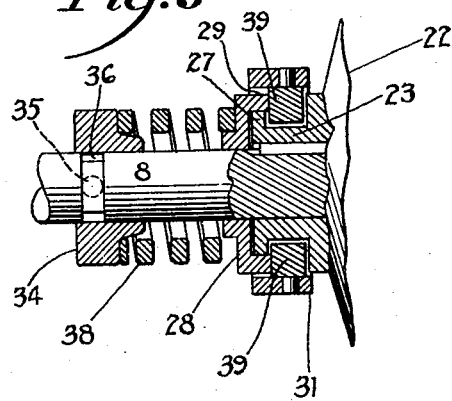
INVENTORS
ARTHUR J. LIEDTKE
CHARLES J. TRAVERSE
By Paul & Paul
ATTORNEYS Patented Nov. 20, 1928.

1,691,978

UNITED STATES PATENT OFFICE.

ARTHUR JOHN LIEDTKE, OF WEST ALLIS, AND CHARLES JACOB TRAVERS, OF PORT WASHINGTON, WISCONSIN, ASSIGNORS TO BEEMAN TRACTOR COMPANY, OF MINNEAPOLIS, MINNESOTA, A CORPORATION OF MINNESOTA.

CLUTCH.

Application filed August 30, 1920. Serial No. 407,050.

Our invention relates to a clutch mechanism adapted for general use but designed particularly for small traction machines where no reverse drive is provided and where it is necessary to pull the machine backwardly by hand.

The object of the invention is to provide a driving clutch mechanism of such construction that the members will be free, when released, and the traction wheels may be revolved backwardly with comparatively little effort, whereas usually it is necessary to drag the machine back by main strength.

A further object is to provide a clutch mechanism which will be simple and inexpensive to operate and easily manipulated and controlled.

Other objects of the invention will appear from the following detailed description.

The invention consists generally in various constructions and combinations, all as hereinafter described and particularly pointed out in the claims.

In the accompanying drawings forming part of this specification,

Figure 2 is a plan view of the clutch mechanism and the driving gear,

Figure 3 is a sectional view on the line 3—3 of Figure 2.

Figure 1:
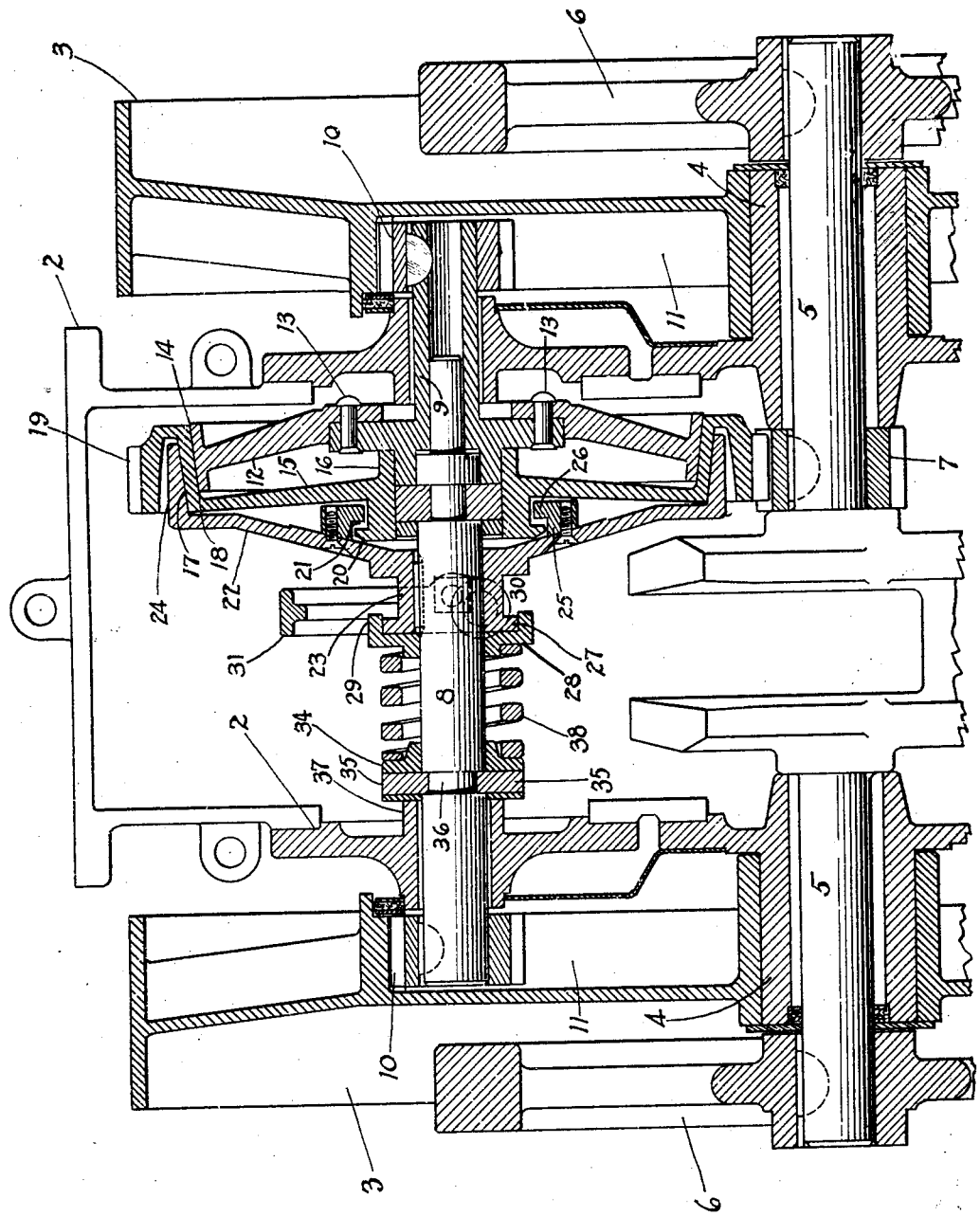
Figure 1 is a sectional view through a portion of a small traction machine, with our improved clutch applied thereto.

In the drawing, 2 represents the frame of the machine and also the crank case of the engine. 3 are the supporting traction wheels having bearings 4, preferably concentric, with the crank shaft 5 that is operatively connected with the engine by suitable means, not shown. 6 represent fly wheels mounted on the projecting ends of the crank shaft. 7 is a driving opinion, secured on the crank shaft. 8 and 9 represent the sections of a counter shaft having pinions 10 thereon meshing with internal gear rings 11 on the traction wheels, said shaft sections being journaled in suitable bearings in the frame 2. This shaft is made in sections to provide for the differential feature of the machine, as usual in mechanisms of this type.

12 is a clutch member secured at 13 to the counter shaft section 9 and having a beveled friction surface 14. 15 is another member of the clutch, having a hub 16 mounted for a limited sliding movement on the counter shaft and provided with friction surfaces 17 and 18 and an external gear 19 which meshes with the driving pinion 7. The hub of the gear member 15 has an annular rib 20 thereon forming with the web of the flange an annular recess or groove 21. 22 represents the third member of the clutch, having a hub 23 that is slidable on the shaft section 8 and provided with a peripheral flange 24 to engage the friction surface 17 when the clutch members are in their working position. A ring 25 is mounted on the web of the clutch member 22 and has an inwardly projecting flange 26 which extends into the recess 21 in position to contact with the rib 20 when the clutch members are separated. The hub 23 has an annular rib 27 on one end and a disc 28 has an annular flange 29 which encircles the rib 27 and projects inwardly beyond the inner face of said rib to overhang an annular recess 30 that is formed in the hub 23. A yoke 31 is mounted to engage the flange 29 and has an arm 32 connected with a flexible operating means 33 which extends to a point within convenient reach of the operator of the machine so that, whenever desired, the arm may be rocked to move the yoke 31 into contact with the flange 29 and exert an outward pressure thereon. A collar 34 is mounted on the shaft section 8 and provided with pins 35 which enter an annular groove 36 in the shaft and the outer face of the collar is arranged to bear on a flange 37 which forms a part of the bearing of the counter shaft. The pins 35 allow the shaft to turn freely in the collar and are sufficiently loose in the groove to allow the outer face of the collar to bear on the frame of the machine to transmit the pressure of the clutch operating spring thereto. A compression spring 38 is interposed between the collar 34 and the disc 28 to be put under compression when the clutch 31 is operated to move the disc outwardly. Normally, the tension of this spring is exerted on the clutch members to seat the member 15 against the fixed clutch member 12 and hold the member 22 against the clutching surface 17 of the intermediate member.

The yoke member 31 has the usual pins 39 mounted to bear on the flange 29 and exert an outward pressure thereon when the clutch shifting arm is operated. This pressure will have the effect of moving the disc to the position indicated in Figure 3 and relieving the hub 23 of the clutch member 22 from the pressure of the spring 38 so that the said clutch member is free to disengage itself from the clutching surface. The pressure of the yoke transmitted through the disc to the spring 38 will be in turn borne by the collar 34 and the flange 37 of the shaft bearing instead of being transmitted to the shaft. The result is, the shaft section will be free to turn on the pins 35, allowing the traction wheel driven therefrom to revolve freely either forward or backward. Continued movement of the clutch yoke will engage the clutch 26 with the rib 20 and disengage the gear clutch member 15 from the clutch member 12 so that both shaft sections will be free and both driving pinions and the traction wheels may be moved forward and backward by hand and the machine operated much more easily than usual in machines of this type where no reverse for the drive is provided.

It will be noted in this device that only one spring is employed, its function being to hold the clutch members in their working position. When this spring is put under compression by the movement of the shifting mechanism, the clutch members and the counter shaft will be free to revolve.

In the operation of the clutch, the initial movement of the shifter will disengage the disc 28 from the hub 23 and relieve the clutch member 22 of the pressure of the spring thereon and this pressure, being transmitted through the collar 34 to the frame, will allow the clutch, the countershaft and the traction wheels to be revolved and the machine moved forwardly or backwardly, as may be desired, without the application of power thereto. This initial movement of the shifter device need not positively disengage the clutch member 22 from its clutching surface, as the flange 29 overhangs the rib 27 and release of the pressure of the spring on the clutch may be accomplished, as indicated in Figure 3, without moving the clutch member 22. Continued movement of the shifter, however, will disengage the clutch member 22 and still further movement will engage the flange 26 with the rib 20 and separate the gear clutch member 15 from the fixed clutch member 12 and thereby effect a positive release of the clutch. As soon as the shifter is released, the pressure of the spring 38 will return the members of the clutch to their normal working position. With this apparatus we are able to drive the traction means of the machine and whenever desired, disengage the clutch members and transmit the pressure of the operating spring to the frame and thereby avoid excessive friction in the bearings and the difficulty of moving the machine by hand.

We claim as our invention:

1. A non-reversing traction machine comprising a frame, a crank shaft, traction wheels for said frame, a gear having a driving connection with said crank shaft and provided with opposing friction surfaces, clutch members having independent driving connections with said traction wheels and mounted to engage said friction surfaces respectively for driving said wheels from said gear, a spring mounted on one side of said clutch members to normally hold them in their clutching position, and mechanism for relieving the pressure of said spring on said clutch members and transferring the pressure to said frame, whereby said clutch members may be moved freely and said traction wheels revolved forward or backward.

2. A non-reversing traction machine comprising a frame, traction means therefor, a crank shaft mounted in said frame, a counter shaft having differential driving connections with said traction means, a gear loosely mounted on said countershaft and having a driving connection with said crank shaft and having opposing friction surfaces, a clutch member secured on said shaft to engage one of said friction surfaces, a second clutch member on the opposite side of said gear, a collar freely mounted on said shaft and having a bearing on said frame, a compression spring interposed between said collar and said second clutch member and normally tending to seat said clutch members on said gear, and mechanism for transferring the pressure of said spring through said collar to said frame to allow said countershaft to revolve freely.

3. A non-reversing traction machine comprising a frame, traction wheels therefor, a crank shaft mounted in said frame, a countershaft having differential driving connections with said wheels, a gear loosely mounted on said countershaft and provided with friction surfaces and having a driving connection with said crank shaft, fixed and loose clutch members mounted to engage said surfaces respectively, a flanged ring mounted on said loose member to enter an annular recess provided in the hub of said gear, a spring normally tending to hold said clutch members and gear in working position, and mechanism for compressing said spring and moving said loose member to disengage said gear and said members and take up end thrust on said countershaft.

4. A non-reversing traction machine comprising a frame, traction wheels therefor, a crank shaft mounted in said frame, a loose gear having a driving connection with said crank shaft and provided with opposing friction surfaces, clutch members having independent driving connections with said traction wheels and mounted to engage said friction surfaces respectively, one of said clutch members having a sliding movement toward and from the clutching surface of said gear, a compression spring mounted to hold said members in their clutching position, a shifting mechanism for relieving said members of the pressure of said spring and transmitting it to said frame, and means interposed between said spring and said sliding clutch member for first relieving the pressure on said member and subsequently moving said member from its clutching position.

5. A non-reversing traction machine comprising a frame, traction wheels therefor, a crank shaft mounted in said frame, a loose gear having a driving connection with said crank shaft and provided with opposing friction surfaces, clutch members having independent driving connections with said traction wheels and mounted to engage said friction surfaces respectively, one of said clutch members having a sliding movement toward and from the clutching surface of said gear, a disc having a flange mounted to encircle a rib provided on the hub of said sliding clutch member, a compression spring mounted to bear on said disc and hold said sliding clutch member toward said gear with a yielding pressure, means for engaging said flange to force said spring outwardly and relieve the pressure on said sliding clutch member, before disengaging said member from its clutching surface, and means for transmitting the pressure on said spring to said frame to allow said clutch members and said driving connections to turn freely forward or backward when said clutch is released.

6. A non-reversing traction machine comprising a frame, traction wheels therefor, a crank shaft mounted in said frame, a countershaft having differential driving connection with said wheels, a gear loosely mounted on said countershaft and provided with friction surfaces and having a driving connection with said crank shaft, clutch members mounted on said countershaft, one of them being fixed and the other free to slide on said shaft, a disc mounted on said countershaft, a collar also freely mounted on said shaft and having a bearing on said frame, a spring interposed between said disc and collar and normally tending to hold said sliding clutch member in its clutching position, mechanism for engaging said disc to force it outwardly and release said sliding clutch member and transfer the pressure of said spring thereon to said collar and frame, thereby allowing said sliding clutch member and said countershaft to turn freely forward or backward.

7. A non-reversing traction machine comprising a frame, traction wheels therefor, a crank shaft mounted in said frame, a countershaft having differential driving connections with said wheels, a gear loosely mounted on said countershaft and provided with friction surfaces and having a driving connection with said crank shaft, clutch members mounted on said countershaft, one of them being fixed and the other free to slide on said shaft, a disc mounted on said countershaft, a collar also freely mounted on said shaft and having a bearing on said frame and free to revolve on said shaft, a spring interposed between said disc and collar and normally tending to hold said sliding clutch member in its clutching position, mechanism for engaging said disc to force it outwardly and release said sliding clutch member and transfer the pressure of said spring thereon to said collar and frame, thereby allowing said sliding clutch member and said countershaft to turn freely forward or backward, and means mounted on said sliding clutch member for engaging said loosely mounted gear subsequent to the initial movement of said sliding member for separating said gear and said fixed clutch member.

8. A non-reversing traction machine comprising a frame and traction and supporting means, and a driving pinion and a gear meshing with said pinion and having friction surfaces, clutch members having independent driving connections with said traction means and mounted to engage said friction surfaces respectively for driving said traction means, a spring interposed between said clutch members and said frame at one side of said gear for normally holding said clutch members in their clutching position, and mechanism interposed between said spring and clutch members for transferring the pressure of said spring from said clutch members to said frame and thereby allow said clutch members and their driving connections and said traction means to run freely forward or backward.

9. A non-reversing traction machine comprising a frame and crank shaft and traction and supporting means and a gear having a driving connection with said crank shaft and provided with clutch surfaces, clutch members having independent driving connections with said traction means and mounted to engage said clutch surfaces respectively for driving said traction means from said gear, a spring arranged to normally hold said clutch members in their clutching position, a fixed abutment constituting a part of the frame for taking up the pressure of said spring and allowing said clutch members, said driving means and said traction means to run freely forward or backward, and means for flexing said spring.

10. A non-reversing traction machine comprising a frame, and a crank shaft and traction and supporting means and a gear having a driving connection with said crank shaft and provided with clutch surfaces, clutch members having independent driving connections with said traction means and mounted to engage said clutch surfaces respectively for driving said traction means from said gear, a spring arranged to normally hold said clutch members in their clutching position and mechanism for relieving said clutch members of the pressure of said spring and allowing said clutch members, said driving means and said traction means to run freely forward or backward, said mechanism comprising means for disengaging one clutch member upon the initial movement of said mechanism and disengaging the other clutch member during subsequent movement of said mechanism.

11. A non-reversing traction machine comprising a frame and a crank shaft and traction and supporting means, clutch members having a driving connection with said shaft and independent driving connections with said traction means, a spring arranged on one side of said clutch members to normally hold them in their clutching position, and means constituting a part of the frame for absorbing the end thrust of said spring and allowing said clutch members, said driving means and said traction means to run freely forward or backward.

12. A non-reversing traction machine comprising a frame and a crank shaft and traction and supporting means, clutch members having a driving connection with said shaft and independent driving connections with said traction means, a spring arranged to normally hold said clutch members in their clutching position, and mechanism for relieving said clutch members of the pressure of said spring and allowing said clutch members, said driving means and said traction means to run freely forward or backward, said mechanism comprising means for disengaging one clutch member upon the initial movement of said mechanism and disengaging the other clutch member during subsequent movement of said mechanism.

13. A non-reversing traction machine comprising a frame, a crank shaft and traction and supporting means, clutch members having independent driving connections with said traction means, and a driving connection with said crank shaft, one of said clutch members being fixed and the other clutch members having an axial movement toward and from said fixed clutch member, a spring arranged on one side of said members for normally holding said axially movable clutch members in their clutching position, and mechanism also arranged on one side of said clutch members for applying pressure to both ends of said spring to release said clutch members and transmit the end thrust of said spring to said frame and allow said traction means to run freely forward or backward.

14. A clutch comprising a member having clutch surfaces, clutch members for said surfaces, driven means connected respectively with said clutch members, a spring arranged on one side of said members for normally holding them in clutching position, means for applying pressure to said spring to compress the same and release said clutch members, and a fixed abutment constituting a part of the frame for taking up end thrust of said spring resulting from such applied pressure.

In witness whereof, we have hereunto set our hands this 21st day of August, 1920.

ARTHUR JOHN LIEDTKE.
CHARLES JACOB TRAVERS.